(12) United States Patent
Horst et al.

(10) Patent No.: US 9,306,286 B2
(45) Date of Patent: Apr. 5, 2016

(54) RADIO FREQUENCY IDENTIFICATION READER ANTENNA AND SHELF

(75) Inventors: Dieter Horst, Cadolzburg (DE); Dan Yu, Beijing (CN); Yong Yuan, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 277 days.

(21) Appl. No.: 13/981,068

(22) PCT Filed: Jan. 20, 2011

(86) PCT No.: PCT/CN2011/070435
§ 371 (c)(1),
(2), (4) Date: Sep. 27, 2013

(87) PCT Pub. No.: WO2012/097517
PCT Pub. Date: Jul. 26, 2012

(65) Prior Publication Data
US 2014/0022140 A1 Jan. 23, 2014

(51) Int. Cl.
*H01Q 1/22* (2006.01)
*H01Q 9/04* (2006.01)
*G06K 7/10* (2006.01)
*H01Q 13/20* (2006.01)
*G06K 17/00* (2006.01)

(52) U.S. Cl.
CPC .......... *H01Q 9/0407* (2013.01); *G06K 7/10356* (2013.01); *H01Q 1/2216* (2013.01); *H01Q 13/20* (2013.01); *G06K 2017/0051* (2013.01)

(58) Field of Classification Search
CPC . H01Q 1/2208; H01Q 1/2216; H01Q 1/2225; H01Q 21/28; G06K 7/10356; G06K 2017/0051
USPC .................................................. 343/731, 737
See application file for complete search history.

(56) References Cited

U.S. PATENT DOCUMENTS

| | | | |
|---|---|---|---|
| 7,999,676 B2 | 8/2011 | Cheung et al. | |
| 8,212,679 B2 * | 7/2012 | Kim et al. | 340/572.7 |
| 8,444,057 B2 * | 5/2013 | Mingle et al. | 235/488 |
| 2005/0168383 A1 | 8/2005 | Lee | |
| 2008/0303734 A1 | 12/2008 | Teshirogi et al. | |
| 2009/0015409 A1 | 1/2009 | Cheung et al. | |
| 2010/0026582 A1 * | 2/2010 | Choi et al. | 343/700 MS |
| 2010/0309061 A1 * | 12/2010 | Sinha | 343/700 MS |
| 2010/0314453 A1 | 12/2010 | Kim et al. | |

FOREIGN PATENT DOCUMENTS

| | | |
|---|---|---|
| CN | 101344932 | 1/2009 |
| CN | 101585443 | 11/2009 |
| EP | 1 919 030 | 5/2008 |

* cited by examiner

*Primary Examiner* — Robert Karacsony
*Assistant Examiner* — Patrick Holecek
(74) *Attorney, Agent, or Firm* — Cozen O'Connor

(57) ABSTRACT

A radio frequency identification (RFID) reader antenna includes a feeding frame, a upper stub unit connected with the first side of the feeding frame, and a lower stub unit connected with the second side of the feeding frame, wherein the upper stub unit includes M first stubs extending towards the second side of the feeding frame, the lower stub unit includes N second stubs extending towards the first side of the feeding frame, the M first stubs and the N second stubs are arranged alternately intervallic, where M, N are integers that are greater than one.

14 Claims, 3 Drawing Sheets

-- Prior Art --

RADIO FREQUENCY IDENTIFICATION READER ANTENNA AND SHELF

CROSS-REFERENCE TO RELATED APPLICATIONS

This is a U.S. national stage of application No. PCT/CN2011/070435 filed 20 Jan. 2011.

BACKGROUND OF THE INVENTION

1. Field of the Invention

The present invention relates to the field of radio frequency identification (RFID) and, more particularly, to a radio frequency identification reader antenna and a shelf.

2. Description of the Related Art

Radio frequency identification (RFID) technology has been widely used recently, and smart shelves are an application scenario of the RFID system. In many shelf applications, the following three questions are particularly important: (i) what kind of goods are on the shelf, (ii) the location of the goods on the shelf, and (iii) when the goods are placed on the shelf or removed from the shelf. Before using RFID technology, the answer to these three questions needs to be obtained relying on manual operations of the staff. For example, the staff have to use a device, such as a barcode scanner, to scan the goods manually. However, after the use of RFID technology, the answer to these three questions can be automatically obtained. The RFID reader can easily determine the tags affixed to the goods, enabling the system to answer these three questions according to the information read from the tags.

FIG. 1 shows an application scenario of a smart shelf with an RFID function. In the application shown in FIG. 1, empty boxes 101 with tags are placed on the top layer 104 of the shelf. At this moment, the reader must be able to read the boxes that are placed in any location on the top layer 104, and prevent two possible cross readings, i.e., reading of lower-layer boxes 102 with tags (such as a box loaded with metal), and reading of boxes that are carried by a person before being placed on the shelf. It should be noted that each layer of the shelf has a metal bottom.

In the prior art, the high frequency (HF) RFID solution is widely used in smart shelves as shown in FIG. 1. It is not difficult to design an HF coil with a size of the antenna 103 as shown in FIG. 1, but the HF RFID has its own problems. On the one hand, the tags of HF RFID are expensive. On the other hand, it is difficult to obtain a far-field/near-field (FF/NF) hybrid solution, i.e., it is impossible to satisfy the need of smart shelves and far-field reading (such as warehousing entrance and exit management) at the same time using only one tag.

Compared with HF RFID, near-field (NF) Ultra High Frequency (UHF) RFID is a more promising technology. Existing NF UHF RFID can use small and cheap tags to obtain a controllable reading area, and it is easy to design an FF/NF hybrid solution. However, due to the difficulty in designing a large planar antenna, this type of antenna can now only be used in narrower shelves, such as book shelves. In practical use, this antenna can be made very long, but it is difficult to make it wide.

For example, the Coplanar Waveguide (CPW) antenna, product model HR RFD-NF09, developed by Hiray Microwave Science and Technology Co., Ltd. is such an NF UHF RFID narrow antenna. For another example, an article published by Carla, et al in IEEE Antennas and Propagation Magazine, vol. 7 in 2008, entitled "RFID Smart Shelf with Confined Detection Volume at UHF" proposed a leaking microstrip line for book shelves.

In order to use a narrow antenna on a large shelf as shown in FIG. 1, the only option is to place the antenna on the edge of the top layer. When the staff lift up the box by the edge of the shelf, the reader will read the tag. However, this solution has the following problems:

1. The antenna must be very narrow (less than 2 cm) to avoid field null reading.
2. Although this type of antenna can read tags which it passes by, its narrower width will affect the reading time. Taking a width of 2 cm and a pass-by speed of 2 m/s, for example, the reading time available for the reader to use is only 10 ms. This will greatly restrict the situation where multiple shelves share one reader.

In order to obtain a planar antenna having a larger size, yet another possible solution is to use leakage slot designs. The article published by Wonkyu Choi, et al in IEEE APSURSI in 2009, entitled "UHF Near-Field Antenna for RFID Smart Shelf" proposed a slot array fed by a microstrip line as shown in FIG. 2. Specifically, this design proposed an electrical coupling planar antenna based on slots, and the basic idea is centered on the use of a microstrip line to feed the slot array on the ground plane, where the slot is at the current peak of the microstrip line. The advantage of this design is that the antenna can be adjusted for shelves of different sizes. However, the field null reading problem of this design is particularly significant, and electrical coupling causes cross reading problems easily. Moreover, in order to construct an array, a power divider may reduce the current fed to each slot.

Therefore, all currently designed UHF RFID antennas have certain problems and cannot be well adapted to the requirements for diversification of shelf applications.

SUMMARY OF THE INVENTION

In view of the foregoing it is therefore an object of the present invention to provide a radio frequency identification reader antenna that is well adapted to the requirements for diversification of shelf applications.

This and other objects and advantages are achieved in accordance with the present invention by providing a radio frequency identification (RFID) reader antenna comprising a feeding frame, an upper stub unit, and a lower stub unit, where the feeding frame comprises a feed source end, a first side, a load end, and a second side that are sequentially connected, the upper stub unit is connected to the first side of the feeding frame, and the lower stub unit is connected to the second side of the feeding frame, and where the upper stub unit includes M first stubs extending toward the second side of the feeding frame, and the lower stub unit includes N second stubs extending toward the first side of the feeding frame, and the M first stubs and the N second stubs are arranged alternately, where M and N are integers greater than 1.

The distance between two adjacent first stubs in the upper stub unit is set to D1 to make the current phases on the two adjacent first stubs opposite, and/or the distance between two adjacent second stubs in the lower stub unit is set to D2 to make the current phases on the two adjacent second stubs opposite.

The distance D1 between two adjacent first stubs in the upper stub unit is an odd multiple of $\lambda/2$, and/or the distance D2 between two adjacent second stubs in the lower stub unit is an odd multiple of $\lambda/2$, where $\lambda$ is the operating wavelength of the reader.

The distance between two adjacent first and second stubs is set to D3 to obtain the maximum current intensity when a first connection point between the first stub and the feeding frame is different from a second connection point between the second stub and the feeding frame. The distance D3 between two adjacent first and second stubs is an odd multiple of $\lambda/4$, where $\lambda$ is the operating wavelength of the reader.

The gap between each first stub and the second side of the feeding frame is set to G1, and the gap between each second stub and the first side of the feeding frame is set to G2, to make the current peaks of two adjacent first and second stubs on the same horizontal line not appear at the same time.

The gap G1 between each first stub and the second side of the feeding frame is an odd multiple of $\lambda/4$, and/or the gap G2 between each second stub and the first side of the feeding frame is an odd multiple of $\lambda/4$, where $\lambda$ is the operating wavelength of the reader.

The length L1 of each first stub is an integral multiple of $\lambda/2$; and/or the length L2 of each second stub is an integral multiple of $\lambda/2$ where $\lambda$ is the operating wavelength of the reader.

The feeding frame is a strip line having a matched load. The width of the first side of the feeding frame narrows down gradually from the feed source end to the load end, and/or the width of the second side of the feeding frame narrows down gradually from the feed source end to the load end.

The feeding frame, the upper stub unit and the lower stub unit are located on the same plane.

The plane where the feeding frame, the upper stub unit and the lower stub unit are located is a base plate of a printed circuit board (PCB).

It is also an object of the present invention to provide a shelf which comprises an antenna as described above, where the antenna is provided in one or more layers of the shelf.

The radio frequency identification reader antenna provided in the embodiments of the present invention can be structurally adapted to the requirements for diversification of shelf applications so as to further ensure that field null readings within a larger near-field space are reduced or eliminated. Therefore, compared with conventional designs, the radio frequency identification reader antenna provided in the embodiments of the present invention has better performance and is very useful for constructing smart shelves.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PREFERRED EMBODIMENTS

Figure 1:
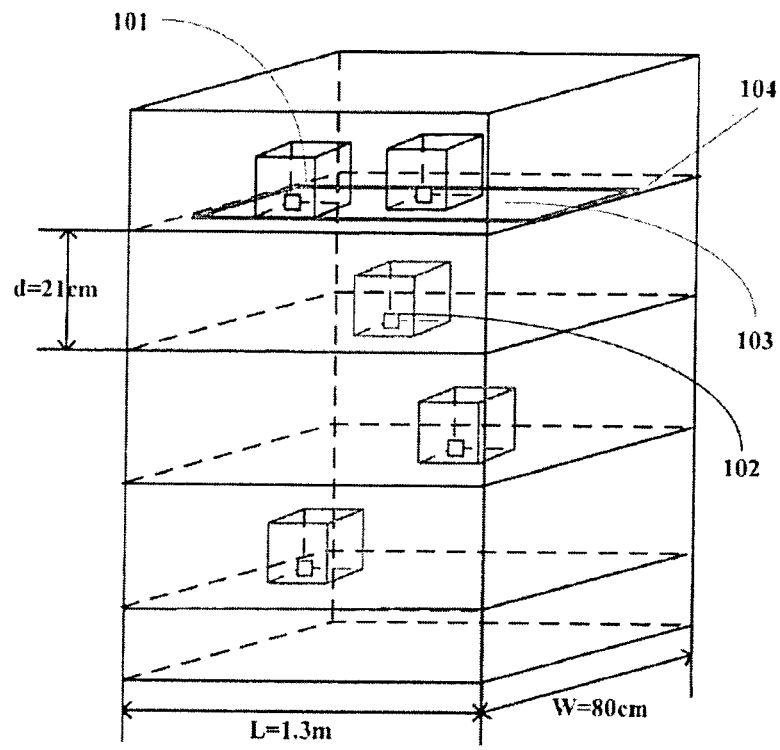
FIG. 1 shows an application scenario of a smart shelf with an RFID function.
Figure 2:
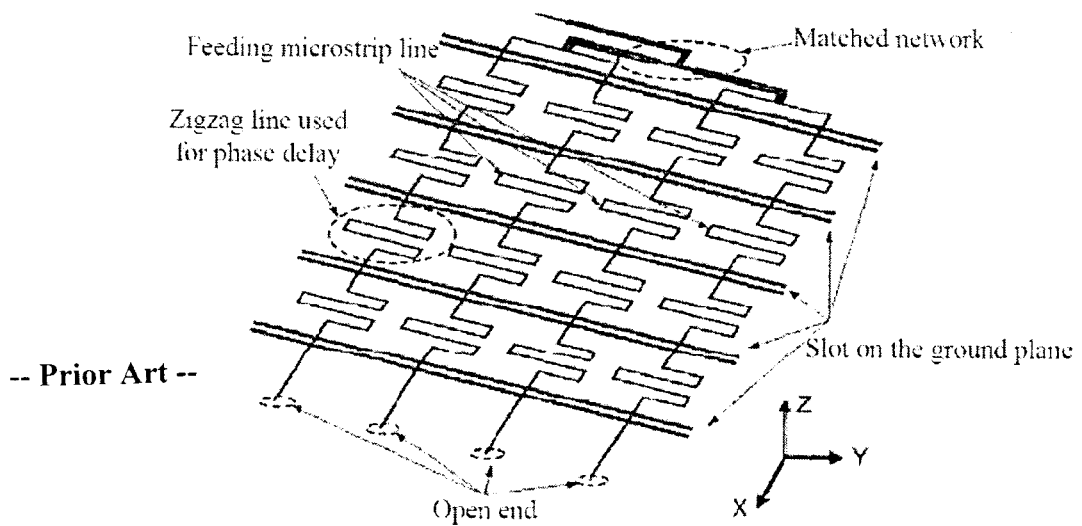
FIG. 2 shows a slot array antenna fed by a microstrip line in the prior art.

In order to make the object, technical solutions and advantages of the present invention more apparent and clear, the present invention will be further described in detail below with reference to the accompanying drawings and by way of embodiments.

The present invention provides a radio frequency identification reader antenna comprising a feeding frame, an upper stub unit connected to a first side of the feeding frame, and a lower stub unit connected to a second side of the feeding frame.

Specifically, the upper stub unit includes M first stubs extending toward the second side of the feeding frame, and the lower stub unit includes N second stubs extending toward the first side of the feeding frame, the M first stubs and the N second stubs being arranged alternately, where M and N are integers greater than 1 or M and N are both 1. It should be noted that using this structure permits more flexibility in designing antennas of different sizes that are applicable for different types of shelves. For example, an antenna with a larger area is designed, or the width of the antenna is made to match with that of the shelf. In the following description, the upper stub unit and the lower stub unit may be collectively referred to as the stub unit, and the first stubs or the second stubs may be collectively referred to as stubs.

In an alternative embodiment, one or more second stubs are disposed between two adjacent first stubs, or one or more first stubs are disposed between two adjacent second stubs.

In a specific embodiment, the distance between two adjacent first stubs in the upper stub unit is set to D1 to make the current phases on the two adjacent first stubs opposite, and/or the distance between two adjacent second stubs in the lower stub unit is set to be D2 to make the current phases on the two adjacent second stubs opposite, thereby having field null readings of the coverage area of the antenna reduced.

Specifically, the distance D1 between two adjacent first stubs in the upper stub unit is an odd multiple of $\lambda/2$ (for example, $\lambda/2$, $3\lambda/2$, $5\lambda/2$), and/or the distance D2 between two adjacent second stubs in the lower stub unit is an odd multiple of $\lambda/2$.

In another specific embodiment, the distance between two adjacent first and second stubs is set to be D3 to obtain a maximum current intensity when a first connection point between the first stub and the feeding frame is different from a second connection point between the second stub and the feeding frame, thereby having field null readings of the coverage area of the antenna reduced.

Specifically, the distance D3 between two adjacent first and second stubs is an odd multiple of $\lambda/4$.

It should be noted that, for a pair of adjacent stubs within each stub unit, because the distance D1 or D2 between the two is an odd multiple of $\lambda/2$, the current phases thereon are opposite, thereby having the magnetic field in the vertical direction between these two stubs strengthened. In addition, because the distance D3 between two adjacent first and second stubs is an odd multiple of $\lambda/4$, when the maximum current is fed to the first stub, the adjacent second stub thereof has the minimum current (for example, the current intensity is 0), and vice versa.

In yet another specific embodiment, the gap between each first stub and the second side of the feeding frame is set to G1, and the gap between each second stub and the first side of the feeding frame is set to G2, to make the current peaks of two adjacent first and second stubs on the same horizontal line not appear at the same time, thereby having field null readings of the coverage area of the antenna reduced. The horizontal line is a virtual line parallel to the line of the feed source port and the matched load.

Specifically, the gap G1 between each first stub and the second side of the feeding frame is an odd multiple of λ/4, and the gap G2 between each second stub and the first side of the feeding frame is an odd multiple of λ/4. Therefore, on the same horizontal line (also called transversal line), current peaks and current nodes will appear alternately on the adjacent first stub and second stub, so as to have field null readings of each stub reduced to a certain extent or eliminated.

In yet another specific embodiment, the length L1 of each first stub is an integral multiple of λ/2, and/or the length L2 of each second stub is an integral multiple of λ/2.

It should be noted that the λ is the operating wavelength of the reader. It should also be noted that the reader can operate at any wavelength. Preferably, the operating wavelength of the reader can be designed according to the frequency range mainly used by UHF RFID, such as 900 MHz or 2.4 GHz which are conventional frequency ranges of UHF RFID.

In practical use, the reader antenna may be disposed on the top layer of the shelf, disposed on any layer of the shelf, or may be disposed on each layer of the shelf, thereby constructing a shelf required for intelligent application. It should be understood that this shelf can be any type of shelf, such as a bookshelf or a warehouse shelf. The signals emitted by the reader with the operating wavelength λ make the antenna disposed on a certain layer of the smart shelf generate a magnetic field and an electric field which, for the goods placed on that layer, can activate the information provided on the tags affixed thereon. Additionally, the size of the antenna can be designed according to the length and width of a certain layer of the shelf, for example, L1, L2, G1, G2 and so on are determined according to the width of the shelf, and for another example, M and N and so on are determined according to the length of the shelf.

Specifically, the feeding frame includes a feed source end, a first side, a load end, a second side that are sequentially connected to form a cycle. The feed source end, the first side, the load end, and the second side can be non-coplanar. Preferably, the feed source end, the first side, the load end, and the second side are coplanar. Furthermore, the first side and the second side are parallel or approximately parallel. Accordingly, each stub is perpendicular or approximately perpendicular to the first side or the second side of the feeding frame. Furthermore, the width of the first side of the feeding frame narrows down gradually from the feed source end to the load end, and this kind of width variation can be a saltus, or it can be a variation in accordance with a certain curve. Similarly, the width of the second side of the feeding frame narrows down gradually from the feed source end to the load end. In an embodiment of the present invention, the feeding frame is a strip line having a matched load, making it relatively simple to implement the feeding frame. Furthermore, the feeding frame may be a coplanar strip line (CPS).

It should be noted that the feeding frame, the upper stub unit and the lower stub unit can be located on the same plane, making the electromagnetic field generated by the reader antenna stronger, thereby increasing the reading distance of the reader. Specifically, the plane of a base plate of a printed circuit board (PCB).

Figure 3:
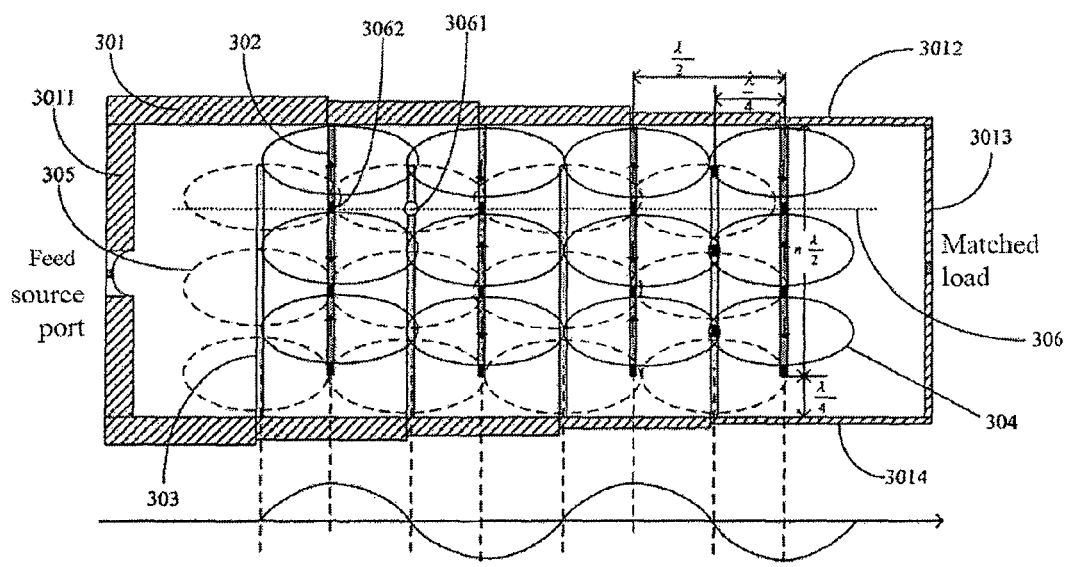
FIG. 3 is a basic structural schematic diagram of an antenna in an embodiment of the present invention.

Specifically, in an embodiment of the present invention, the basic structure of an antenna is as shown in FIG. 3, and the antenna is a planar comb near-field antenna with the following components: a CPS frame 301, an upper stub unit 302, and a lower stub unit 303.

The CPS frame 301 has a matched load and is used for generating a traveling wave current to be fed to the stubs. The CPS frame 301 includes a feed source end 3011, a first side 3012, a load end 3013 and a second side 3014. As evident from FIG. 3, the width of the first side 3012 and the second side 3014 strip lines transitions gradually to compensate for the influence of the impedance brought by added stubs. The upper stub unit 302 is formed by one or more first stubs. Similarly, the lower stub unit 303 is formed by one or more second stubs. Each stub is a microstrip line having an open circuit end for generating a standing wave current.

Moreover, solid line circles 304 are magnetic field areas covered by the upper stub unit 302, and dotted line circles 305 are magnetic field areas covered by the lower stub unit 303.

As evident, the arrangement of the upper stub unit 302 and the lower stub unit 303 as shown in FIG. 3 has the following advantages:

(1) When the upper stub unit 302 obtains the maximum current, the lower stub unit 303 cannot obtain the maximum current, thus having field null readings of the coverage area of the antenna reduced. For example, when D3 is λ/4, the lower stub unit 303 can obtain the minimum current only.

(2) On the same horizontal line 306, the current peak 3061 and the current node 3062 appear in first stubs and second stubs alternately. For example, at time t1, the current peak appears in the lower stub unit, while the current node appears in the upper stub unit. At time t2, the current peak appears in the upper stub unit, while the current node appears in the lower stub unit.

The upper stub unit and the lower stub unit obtain the current at different times. As a result, these two stub units produce magnetic fields alternately, which will avoid possible interference between these two units. For a pair of stubs within each stub unit, the current phases thereon are opposite to help produce a magnetic field perpendicular to the antenna plane. On the other hand, because the current peak and the current node appear alternately on the same horizontal line, the magnetic fields will compensate for each other, thus having field null readings reduced.

It should be noted that the planar UHF RFID antenna shown in FIG. 3 can meet the requirements of Table 1, thus adapting to the application scenario shown in FIG. 1.

TABLE 1

Specification requirements of antenna

| Item | Specification |
| --- | --- |
| Coverage area | Length: 130 cm; width: 80 cm |
| NF Reading performance | No field null reading in the coverage area, and the reading distance has little influence |
| Leakage | Prevent boxes on lower layers and boxes carried by people from producing cross reading |
| Bandwidth | −10 dB in the [850 MHz, 960 MHz] range, to eliminate the influence of the metal bottom |
| Applicable rules | ETSI 302 208 V1.3.1 (beam width smaller than 90 degrees) |
| Tag | Near-field magnetic tags affixed to the bottom of the boxes |

Compared with the existing solutions, the antenna provided in the disclosed embodiments of the present invention can ensure that field null readings within a larger near-field space are reduced or eliminated, which therefore is very useful for constructing smart shelves. Specifically, the antenna has at least one of the following advantages.

Figure 4:
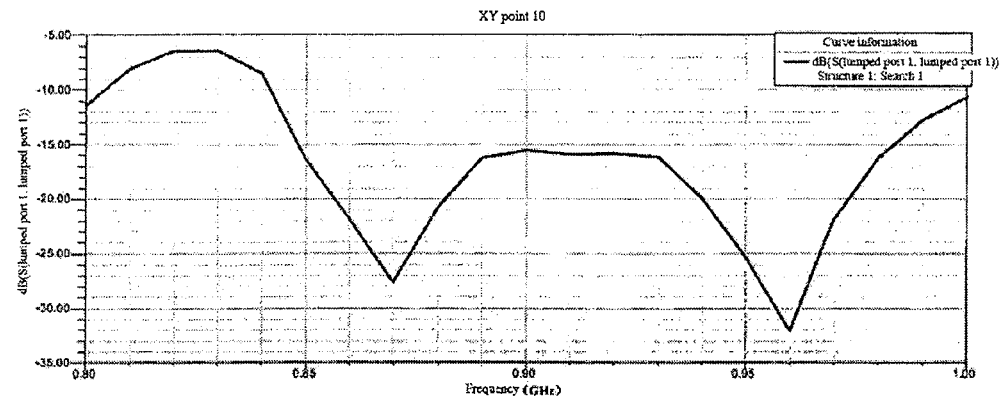
FIG. 4 is a schematic diagram of an S11 simulation result of a transmission line at different frequencies in an embodiment of the present invention.

First, the transmission line has a characteristic impedance matching with the feed port and the terminal load. As a result, broadband antennas are readily available for the disclosed embodiments of the present invention. Specifically, the S11 performance examples of the transmission line at different frequencies are as shown in FIG. 4. As evident from FIG. 4, the antenna provided in the present invention has an S11 bandwidth of −10 dB in the [850 MHz, 960 MHz] frequency range.

Secondly, the upper stub unit and the lower stub unit of the antenna provided in the disclosed embodiments of the present invention generate magnetic fields alternately. Although there may be many field null readings in any instant, the magnetic fields of the whole cycle can eliminate most of the field null readings after being combined. Also, residual field null readings can be further eliminated by optimizing parameters.

Figure 5:
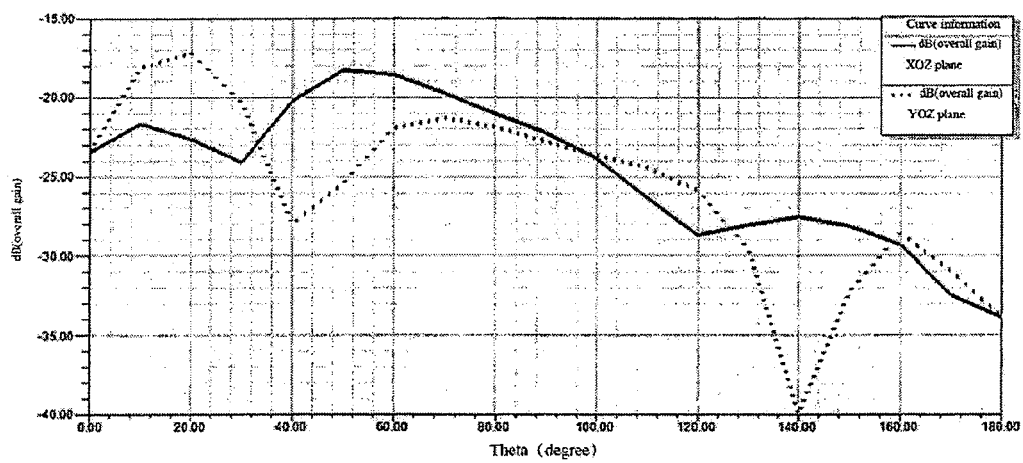
FIG. 5 is a schematic diagram of a simulation result of a far-field gain of an antenna on an XOZ plane and a YOZ plane in an embodiment of the present invention.

Thirdly, it can be known from the simulation that, in a specific implementation, the far-field gain of the antenna provided in the present invention is −17 dB. Specifically, FIG. 5 is a schematic diagram of the simulation result of the far-field gain of the antenna on the XOZ plane and the YOZ plane. Therefore, the antenna can effectively reduce the risk of cross reading.

What are described above are merely preferred embodiments of the present invention and not intended to limit the present invention, and any modification, equivalents, improvements made in the spirit and principles of the present invention shall be included in the protective scope of the present invention.

Thus, while there have shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A radio frequency identification (RFID) reader antenna, comprising:
   a feeding frame;
   an upper stub unit; and
   a lower stub unit;
   wherein the feeding frame comprises a feed source end, a first side, a load end, and a second side that are sequentially connected, the upper stub unit is connected to the first side of the feeding frame, and the lower stub unit is connected to the second side of the feeding frame;
   wherein the upper stub unit includes M first stubs extending toward the second side of the feeding frame, and the lower stub unit includes N second stubs extending toward the first side of the feeding frame, the M first stubs and the N second stubs being arranged alternately, and M and N being integers greater than 1; and
   wherein at least one of (i) a width of the first side of the feeding frame narrows in a direction from a feed source end to a load end and (ii) a width of the second side of the feeding frame narrows in a direction from the feed source end to the load end.

2. The RFID reader antenna as claimed in claim 1, wherein at least one of (i) a distance between two adjacent first stubs in the upper stub unit is set to D1 to ensure opposite current phases on the two adjacent first stubs and (ii) a distance between two adjacent second stubs in the lower stub unit is set to D2 to ensure opposite current phases on the two adjacent second stubs.

3. The RFID reader antenna as claimed in claim 1, wherein at least one of (i) a distance D1 between two adjacent first stubs in the upper stub unit is an odd multiple of $\lambda/2$ and (ii) a distance D2 between two adjacent second stubs in the lower stub unit is an odd multiple of $\lambda/2$, $\lambda$ being an operating wavelength of the RFID reader antenna.

4. The RFID reader antenna as claimed in claim 1, wherein a distance between two adjacent first and second stubs is set to D3 to obtain a maximum current intensity when a first connection point between the first stub and the feeding frame is different from a second connection point between the second stub and the feeding frame.

5. The RFID reader antenna as claimed in claim 1, wherein a distance D3 between two adjacent first and second stubs is an odd multiple of $\lambda/4$, $\lambda$ being an operating wavelength of the RFID reader antenna.

6. The RFID reader antenna as claimed in claim 1, wherein a gap between each first stub and the second side of the feeding frame is set to G1, and a gap between each second stub and the first side of the feeding frame is set to G2 such that current peaks of two adjacent first and second stubs on a same horizontal line do not appear at the same time.

7. The RFID reader antenna as claimed in claim 1, wherein at least one of (i) a gap G1 between each first stub and the second side of the feeding frame is an odd multiple of $\lambda/4$ and (ii) a gap G2 between each second stub and the first side of the feeding frame is an odd multiple of $\lambda/4$, $\lambda$ being an operating wavelength of the reader.

8. The RFID reader antenna as claimed in claim 1, wherein at least one of (i) a length L1 of each first stub is an integral multiple of $\lambda/2$ and (ii) a length L2 of each second stub is an integral multiple of $\lambda/2$, $\lambda$ being an operating wavelength of the RFID reader antenna.

9. The RFID reader antenna as claimed in claim 1, wherein the feeding frame is a strip line having a matched load.

10. The RFID reader antenna as claimed in claim 1, wherein the feeding frame, the upper stub unit and the lower stub unit are located on the same plane.

11. The RFID reader antenna as claimed in claim 10, wherein the plane at which the feeding frame, the upper stub unit and the lower stub unit are located comprises a base plate of a printed circuit board (PCB).

12. A shelf comprising:
   a radio frequency identification (RFID) reader antenna, comprising:
   a feeding frame;
   an upper stub unit; and
   a lower stub unit;
   wherein the feeding frame comprises a feed source end, a first side, a load end, and a second side that are sequentially connected, the upper stub unit is connected to the first side of the feeding frame, and the lower stub unit is connected to the second side of the feeding frame;
   wherein the upper stub unit includes M first stubs extending toward the second side of the feeding frame, and the lower stub unit includes N second stubs extending toward the first side of the feeding frame, the M first stubs and the N second stubs being arranged alternately, and M and N being integers greater than 1;
wherein the RFID reader antenna is provided in one or more layers of the shelf; and
wherein at least one of (i) a width of the first side of the feeding frame narrows in a direction from a feed source end to a load end and (ii) a width of the second side of the feeding frame narrows in a direction from the feed source end to the load end.

13. A radio frequency identification (RFID) reader antenna, comprising:
a feeding frame;
an upper stub unit; and
a lower stub unit;
wherein the feeding frame comprises a feed source end, a first side, a load end, and a second side that are sequentially connected, the upper stub unit is connected to the first side of the feeding frame, and the lower stub unit is connected to the second side of the feeding frame;
wherein the upper stub unit includes M first stubs extending toward the second side of the feeding frame, and the lower stub unit includes N second stubs extending toward the first side of the feeding frame, the M first stubs and the N second stubs being arranged alternately, and M and N being integers greater than 1; and
wherein a gap between each first stub and the second side of the feeding frame is set to G1, and a gap between each second stub and the first side of the feeding frame is set to G2 such that current peaks of two adjacent first and second stubs on a same horizontal line do not appear at the same time.

14. A radio frequency identification (RFID) reader antenna, comprising:
a feeding frame;
an upper stub unit; and
a lower stub unit;
wherein the feeding frame comprises a feed source end, a first side, a load end, and a second side that are sequentially connected, the upper stub unit is connected to the first side of the feeding frame, and the lower stub unit is connected to the second side of the feeding frame;
wherein the upper stub unit includes M first stubs extending toward the second side of the feeding frame, and the lower stub unit includes N second stubs extending toward the first side of the feeding frame, the M first stubs and the N second stubs being arranged alternately, and M and N being integers greater than 1; and
wherein at least one of (i) a gap G1 between each first stub and the second side of the feeding frame is an odd multiple of $\lambda/4$ and (ii) a gap G2 between each second stub and the first side of the feeding frame is an odd multiple of $\lambda/4$, $\lambda$ being an operating wavelength of the reader.

* * * * *